INVENTOR
Bo N. Hoffstrom

# United States Patent Office 3,140,937
Patented July 14, 1964

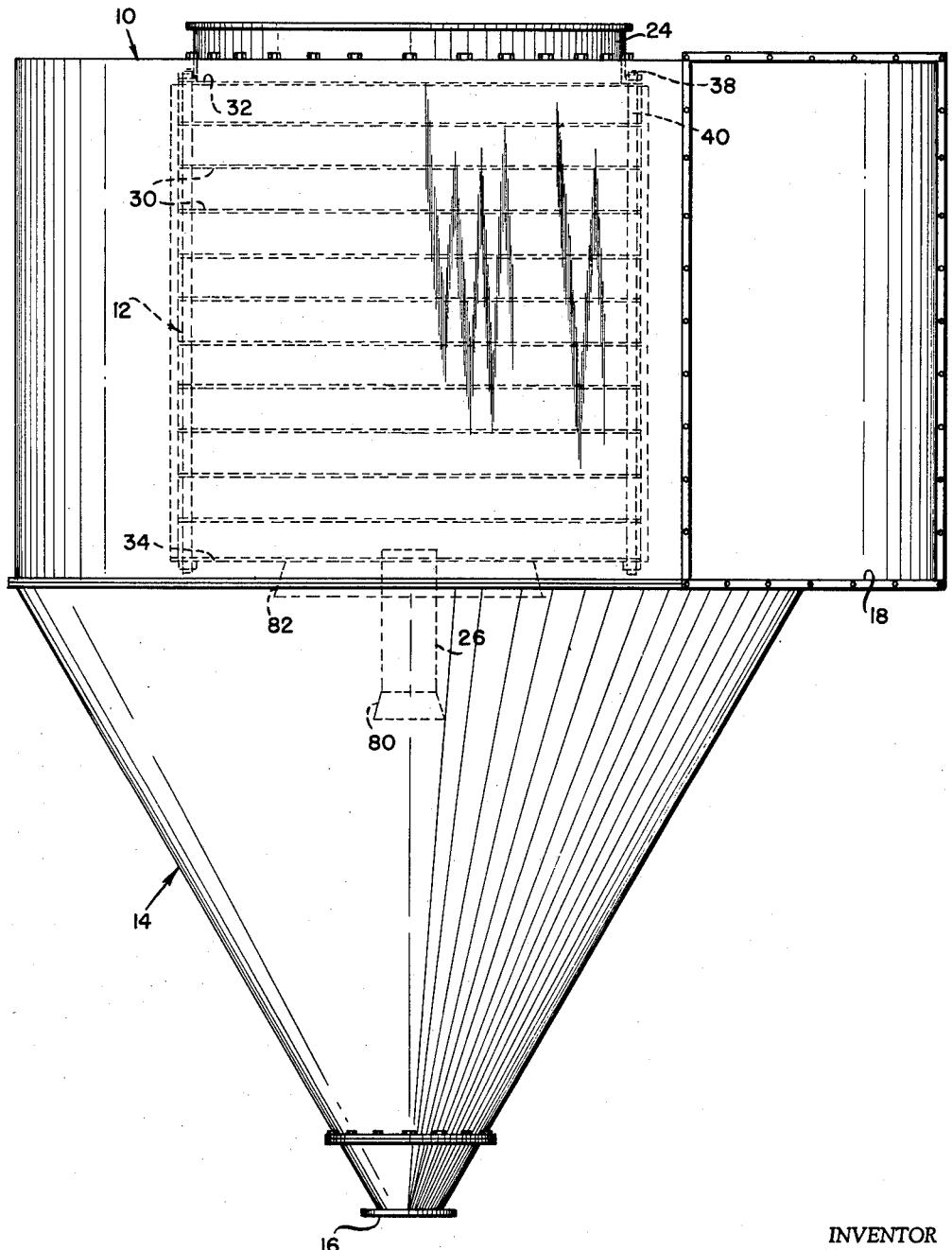

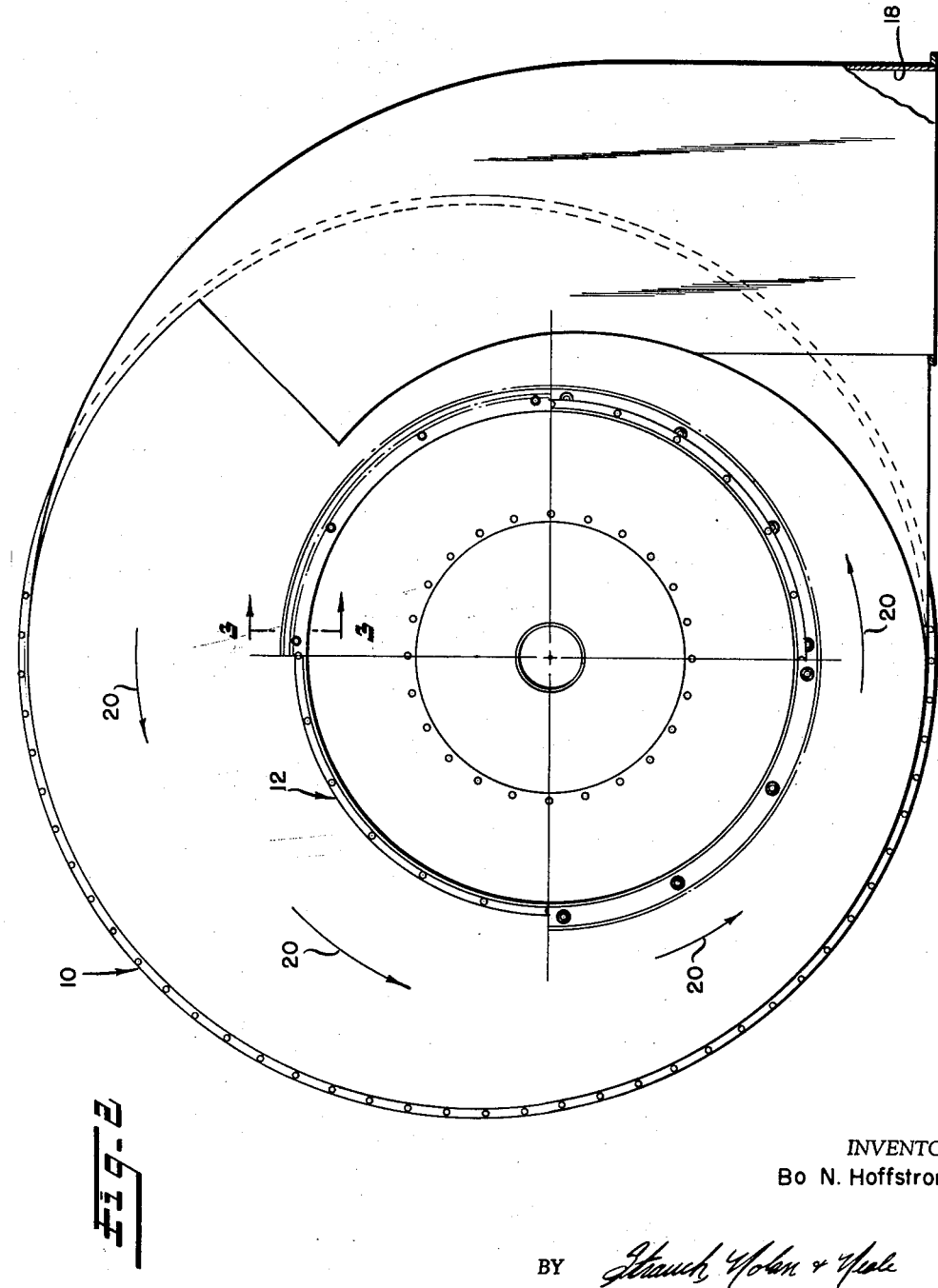

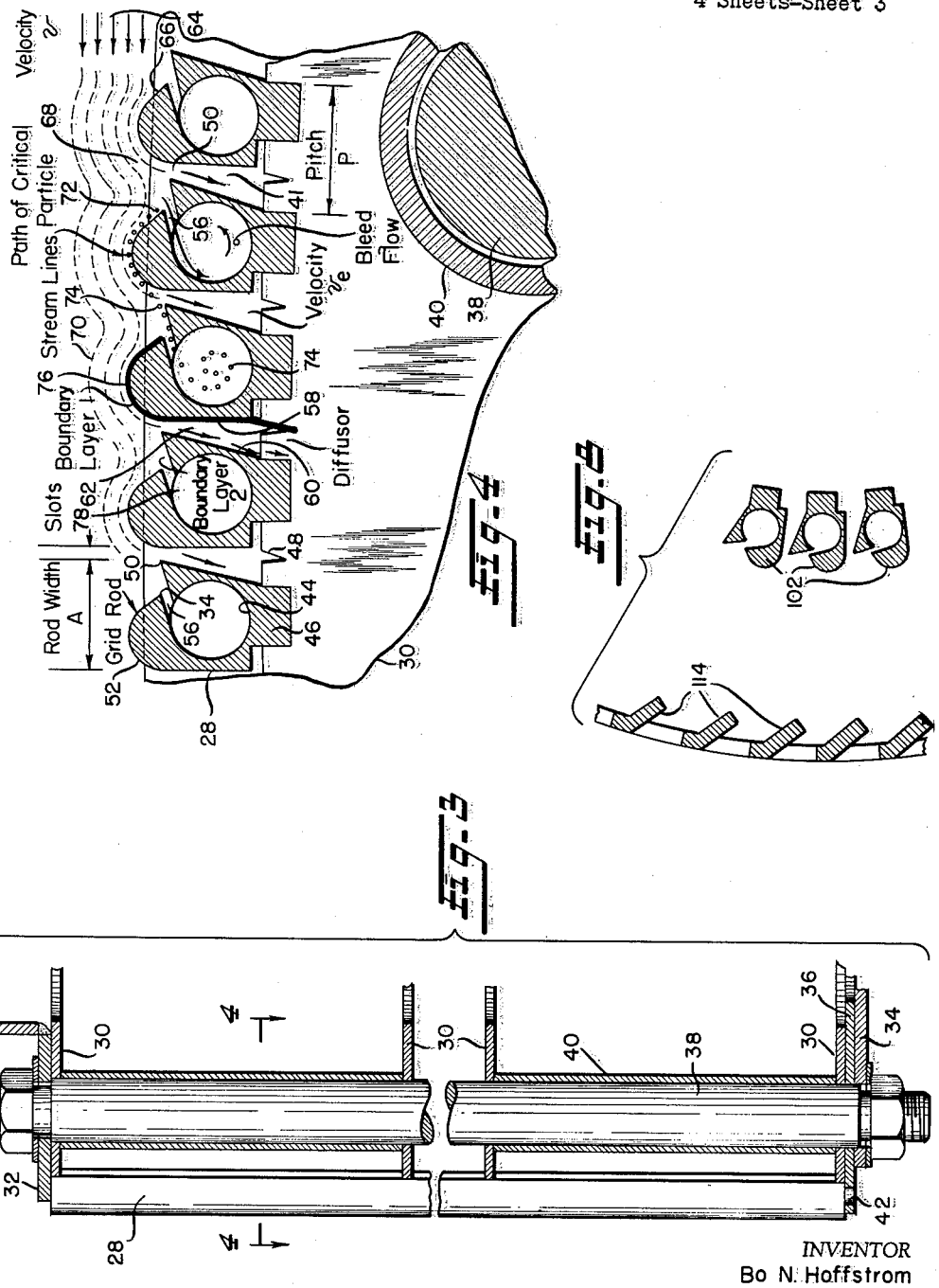

3,140,937
SEPARATORS
Bo N. Hoffstrom, Los Angeles, Calif., assignor to Douglas
Aircraft Company, Inc., Santa Monica, Calif.
Filed May 24, 1960, Ser. No. 31,402
4 Claims. (Cl. 55—442)

The present invention relates to apparatus for separating particles from a gas or liquid stream and more particularly to such apparatus of the type employing a novel grid construction to effect the separation.

The use of bars or vanes arranged in grid patterns for separating particles out of gases or liquids is well known and separators incorporating grids of various designs are now in use in industry. However, the relatively low efficiency of such units has prevented their adoption and use in many applications for which they are otherwise ideally suited.

Generally, a grid separator functions by subjecting the fluid to a local centrifugal field. In this field the particles gravitate locally in a direction away from a portion of the fluid stream and this portion of the fluid becomes free from particles. This particle free portion of the fluid is caused to follow one path while the remaining fluid containing the particles is caused by the grid to follow another separate path for further treatment.

The lack of efficiency of prior constructions has been due in part to the failure to control the effects of secondary flow phenomena, particularly those derived from the friction between the fluid and the surfaces of the grid members.

As is well known, a fluid moving relative to a solid wall develops a boundary layer which is stationary next to the wall and gradually increases in velocity until it reaches the main flow velocity, the velocity increasing as a function of the distance from the wall. The direction of the flow of the boundary layer depends on local pressure gradients. Thus flow in a particular zone may, in the absence of proper control, be opposite to that of the main flow with resulting loss of efficiency. Particles entrained in the boundary layer will follow it and if it moves in the wrong direction these particles will also move the wrong way again producing substantial loss of separating efficiency.

Another phenomenon that has caused undesirable passage of particles through the grid is turbulence. The elimination of undesirable turbulence is a feature of the present invention.

The separator of the present invention also provides a maximum of diffusion of the fluid after it has passed the separating zone and thus significantly reduces pressure losses in operation.

With the foregoing considerations in mind, it is the primary purpose of the present invention to provide improved grid separators which effect separation with greater efficiency than prior devices of this general type, principally because of the utilization of unique structure which for the first time in the art eliminates or significantly reduces the objectionable effects of boundary layer phenomena, turbulence and pressure gradients.

It is a further object of the present invention to provide improved grid separators which are of simple rugged construction and which have an extended trouble free service life.

It is a further object of the present invention to provide improved grid separators in which the individual grid members are of novel construction and are arranged with respect to each other and with respect to the flow patterns established in the overall apparatus to provide the desired separation efficiently and with minimum power consumption.

Additional objects and advantages will become apparent as the description proceeds in connection with the accompanying drawings in which:

FIGURE 1 is a side elevation of a separator constructed in accordance with the present invention;

FIGURE 2 is a top plan view of the separator of FIGURE 1;

FIGURE 3 is an enlarged fragmentary section taken along line 3—3 of FIGURE 2 showing details of construction;

FIGURE 4 is an enlarged fragmentary section taken along line 4—4 of FIGURE 3 illustrating further details of the novel grid structure and the separating action produced thereby;

FIGURE 8 is a fragmentary section taken along line 8—8 of FIGURE 7.

Figure 6:
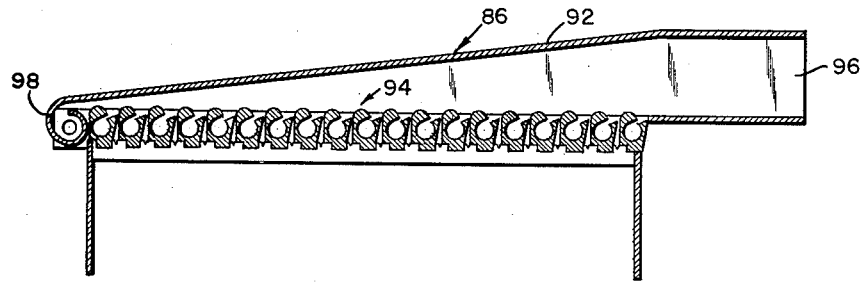
FIGURE 6 is a horizontal section taken along line 6—6 of FIGURE 5.

Referring now more particularly to FIGURES 1-4 of the drawings, in its preferred form the grid separator of the present invention comprises an upper scroll section 10 containing the generally cylindrical grid separator structure 12 and the lower particle receiving cone section 14 having an outlet 16 at its lower end. The upper section 10 is provided with an inlet section 18 through which a fluid containing particles enters the separating apparatus. The inlet is so arranged that the air is caused to flow in a generally circular pattern as indicated by the arrows 20 through the scroll section 10, which as best shown in FIGURE 2, is of constantly decreasing radius in the direction of flow. It will be understood, however, that other means such as louvers may be utilized to produce this flow pattern. As explained in detail below, substantially all of the air will pass through the grid assembly 12 at which point separation of the particles occurs. The air then exits from the apparatus through the central cylindrical top opening 24. A very small portion of the air passes downwardly into the cone section 14 and rejoins the exiting air stream after passing through a center throat 26. The separated particles all ultimately collect in the cone section 14 from which they may be removed continuously or periodically depending upon the nature of the apparatus employed at the outlet 16.

The upper scroll section 10 and the lower cone section 14 are fabricated in accordance with conventional sheet metal techniques and details of construction accordingly will not be described here.

The individual grid rods 28 described in detail below are anchored in a plurality of rings 30 and are clamped between upper and lower end plates 32 and 34, respectively, the latter separating the space inside the rods from the space outside the rods. These components are held in assembled relation by a number of through bolts 38 and spacers 40. The grid rods 28 are uniformly spaced to provide passages 41 between them. As best shown in FIGURE 3, an additional ring 36 just above the bottom plate 34 is provided with a series of openings 42 in alignment with the central openings 44 formed in each of the grid rods 28. The upper end plate 32 is imperforate. As best shown in FIGURE 4, the grid rods 28 are provided with mounting projections 46 which fit within corresponding notches in the periphery of the rings 30. The rods 28 are assembled to the rings 30 by inserting the mounting sections 46 into the corresponding notches and then deforming the metal of the rings 30 into tight frictional contact with the mounting sections 46 by the use of a staking tool which leaves the V-shaped notch 48. The individual rods 28 are preferably formed of extruded aluminum and are thus of uniform section along their length. Each of the rods is provided with a sharp lip 50 facing toward the direction of flow and a smoothly rounded convex section 52 leading away from a second sharp lip 54 formed at one side of a longitudinally extending slot 56 connecting the exterior of the rods to the central openings 44. The downstream surface 58 of each of the rods is essentially radially directed while the upstream surface 60 is inclined away from the radius to provide a diffuser throat 62 as shown in FIGURE 4.

In operation assuming that air under pressure and containing particles is supplied through the inlet 18 and that the outlet 24 is connected to the atmosphere, the air will flow in a counterclockwise direction as viewed in FIGURE 2 around and through the grid structure 12. This motion effects a preliminary separation involving the coarsest particles which are thrown outwardly against the outer wall of the scroll section and dropped down into the cone. However substantially all of the separation is effected by the grid structure in a manner now to be described in detail.

The fluid containing particles moves parallel to the general outline on the grid in a direction shown by the arrows 64 with a certain velocity V. The innermost layer of the fluid indicated at 66 follows the convex surface portion 52 of the adjacent rod through a turn of about 135° and then passes through the following exit slot 41, through the diffuser section 62 and upwardly out of the exit 24. The next layer of fluid 68 is diverted by the pointed edge 50 of the following rod. As this layer of fluid passes the longitudinal slot 56 some of the fluid in the layer is bled off through the slot into the core hole 44. The remainder of this layer flows past the convex section 52 of the rod and out through the next following exit slot. Thus the general flow pattern of fluid flow in the neighborhood of the rods is indicated by the stream lines 70.

The particles follow a slightly different pattern. Assuming a particle reaches the point 72, it will be carried by the fluid around the convex surface 52 of the next adjacent rod but due to the centrifugal force set up by the movement through the turn, the particle will drift away from the rod and reach the next following layer of fluid as it approaches the pointed edge 50 of the next adjacent rod. Here the particle will be caught by the pointed edge 50 and follow the flat surface next to this edge through the slot 56 into the core hole 44. Thus the path of the particle is indicated by the reference line 74.

This path may be termed the "path of the critical particle." The critical particle may be defined as the particle having a size such that it will just barely move radially from the surface of the rod at the beginning of the convex surface 52 to a point beyond the pointed edge 50 of the next adjacent rod. The size of the critical particle is determined by the difference in specific weights between the particle and the fluid, by the viscosity of the fluid, by the velocity $v$ of the fluid and by the spacing of the rods. The radial distance the particle travels while it moves from one rod to the next rod is determined by the width of the grid slot 41. An increase in this distance increases the critical particle size. It is also clear that the higher the fluid velocity $v$ is, the stronger becomes the centrifugal field that causes the particle to drift away from the rod. Thus it can be shown that the critical particle size $d$ is determined by the following equations:

$$d = K\sqrt{\frac{3S}{v}} \text{ inches}$$

$$K^2 = \frac{6A}{\pi} \cdot \frac{w_2}{w_1 - w_2}$$

Assuming laminar flow about the particle (Strokes region). Where:

$A =$ kinematic viscosity (square inches per second)
$w_1 =$ particle specific weight (pounds per cubic inch)
$w_2 =$ fluid specific weight (pounds per cubic inch)
$S =$ slot width (inches)
$v =$ main flow velocity (inches per second)

Thus in standard air:

$$d = 220\sqrt{\frac{S}{v}} \text{ microns}$$

Any particle of critical size or any particle larger than critical size will be precluded from passage through the grid slots. Thus all of the air passing through the grid slots and out through the exit 24 of the apparatus will contain only particles which are less than the critical size defined above.

The efficiency of the grid of the present invention depends upon the effective control of the boundary layer following the flow through the grid slots 41 and the slots 56 communicating with the core holes 44. These layers are indicated at 78 and 80, respectively, in FIGURE 4. Both of these boundary layers are withdrawn at frequent intervals along the grid and are prevented from building up to detrimental thickness, which contributes significantly to the efficiency of the device. The effective thickness of the boundary layer 76 at the point of withdrawal into the grid slot 41 can be calculated and must be taken into account in the evaluation of the volume flow capacity of the grid. The effectvie area of the exit slot 41 is thus smaller than the physical width of the slot and specifically by the displacement thickness of the boundary layer. Thus the volume flow capacity of the grid may be given by the following equation:

$$V = nlv_e (S - \Delta)$$

where:

$n =$ number of slots
$l =$ length of slots (inches)
$v_e =$ fluid velocity in the slot (inches)
$\Delta =$ boundary layer dislacement thickness (inches)

Thus, for a cylindrical grid arrangement:

$$V = \pi D l v_e x$$

$$x = \frac{S - \Delta}{S + t}$$

where:

$D =$ grid cylinder diameter (inches)
$x =$ relative opening (effective)
$t =$ rod width (inches)

In this equation the fluid exit velocity $v_e$ is assumed to be different from the main fluid velocity $v$ along the outline of the grid. It is important that the flow velocity $v_e$ through the slots is not allowed to exceed the main flow velocity $v$ because in that case a reduction in pressure would occur at the exit slot which would tend to pull the boundary layer developed beyond the pointed edge 50 of the next rod backwards and through the slot carrying with it some particles larger than particles of the critical size. It has been discovered that it is permissible and desirable to let the flow velocity $v_e$ through the slot 41 be less than the main flow velocity $v$ since this simply increases the static pressure in the slot area and aids in moving the boundary layer 78 in the proper direction beyond the sharp edge 50 through the slot 56 into the core hole 44.

Since the boundary layers are removed at frequent intervals, no turbulence will develop causing uncontrolled particle movement. To facilitate the removal of the boundary layer, it is particularly important that the edges 50 and 54 be sharp and so disposed with respect to the flow as to part the stream lines without developing stall or boundary layer separation. A blunt surface at the point 50, for example, would cause a stagnation area of significant width to develop, which would have the same effect as an increase in the slot width which would thus increase the critical particle size and significantly lower the efficiency of the unit. A blunt edge 54 would generate a thicker boundary layer along the convex surface 52 which would be particularly undesirable since an increase in the thickness of the boundary layer in this area would entrain more particles and would reduce the flow velocity which again would increase the critical particle size and reduce the separation efficiency of the unit.

Further, the stagnation areas generated by blunt edges in lieu of the sharp edges 50 and 54 would cause a deposit of particles at these points which would gradually build up to a point where serious interference would occur with the function of the separator or where the grid would become partially or completely clogged.

As the clean air passes through the diffuser section 62 of the exit slot 41, some of the velocity head associated with the exit velocity $v_e$ is regained thus reducing the total pressure loss caused by the separator. The general direction of the exit diffuser section is such as to discharge the fluid in a nearly radial direction when the grid is arranged in a cylindrical pattern as is the case in the embodiment of FIGURES 1–4. This arrangement helps prevent the formation of a strong vortex inside the grid cylinder which, if allowed to form, would cause an increased back pressure which would have to be overcome by the flow through the separator. However a slight vortex flow inside the circular grid structure is desirable since it reduce the pressure about its center for a purpose to appear. Accordingly, the grid rods are positioned so as to discharge the air passing through the grid in a slightly off-center direction to produce a slight vortex flow.

From the foregoing it will be apparent that the particles pass into the cone section 14 in three paths. The largest particles will follow the scroll wall and drop directly into the conical section 14. They will not approach the grid structure because the centrifugal force acting on them is much greater than the air drag pulling them toward the grid. Some of the slightly smaller particles will spiral under the influence of gravity just outside the grid rods down into the conical section 14. The smaller particles will follow the air into the space just outside the grid structure and there be subjected to the local forces described earlier and all of the remaining particles above the critical particle size will enter the core holes and discharge into the cone 14 through the openings 42 in the bottom plate 34. All particles will gravitate toward the apex of the cone 14. From there they can be sent into a storage hopper or removed by any other suitable means.

Since a certain amount of air also flows into the cone 14 through the core holes 44 and additional air is fed into the same space through the boundary layer that develops on the inside of the cone surface, provision is also made to drain this air out of the space so that it may exit from the device through the main outlet 24. For this purpose the tubular outlet throat 26 having a flared lower end 80 is mounted on the lower plate 36 concentric with the axis of the grid structure. The principal purpose of the drain throat is to prevent reverse air flow in the area between the lower end of the grid structure and the upper part of the cone 14. If allowed to occur, this reverse flow would carry some particles back into the space surrounding the grid and thus promote a concentration of particles there, some of which would find their way through the grid and reduce the overall efficiency of the separator. Flow of air upwardly through the drain throat 26 is facilitated by the slight vortex which is developed in the grid structure by the slight angular disposition of the slots between the adjacent grid bars.

Since the air entering the cone is revolving, a vortex is developed that will prevent particles from following the drain air through the throat 26 as in an ordinary cyclone cleaner. Because of the vortex circulation in this space, there is also a boundary layer flow radially inward along the lower surface of the bottom plate 36. To prevent particles discharged from the core holes from following this boundary flow to the center where they might be caught by the drain flow through throat 26, an annular barrier 82 is secured to the lower surface of plate 36. As shown in FIGURE 1, the barrier is frusto-conical, its bottom diameter being larger than its top diameter in order to drive the boundary layer that forms on it away from its lower edge by means of a general pressure gradient existing in the surrounding vortex. Thus particles cannot be carried over the edge of the barrier by the boundary layer flow. For the same reason, the flared portion 80 of the outlet throat 26 is provided.

Figure 5:
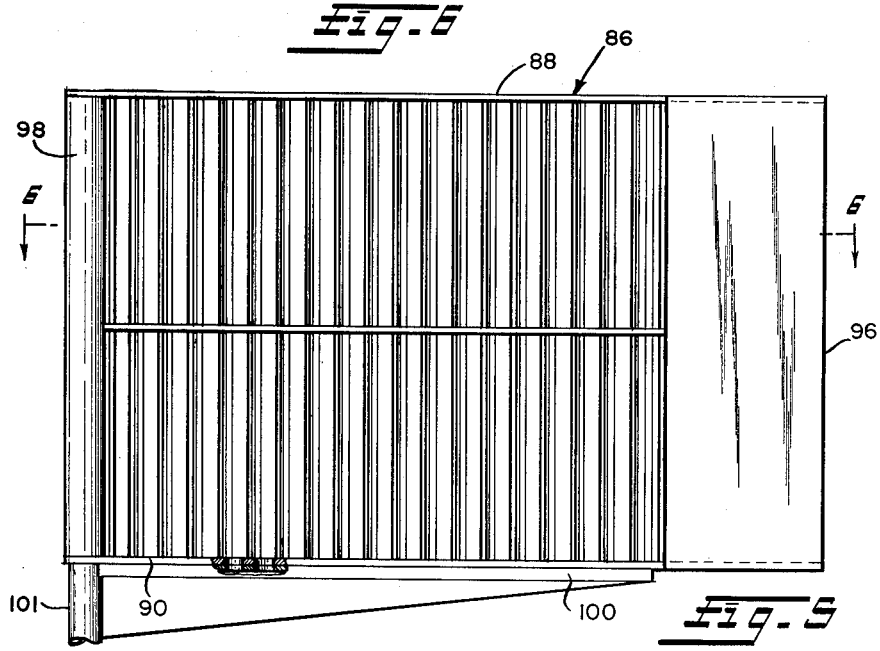
FIGURE 5 is a side elevation of a modified form of the invention.

FIGURES 5 and 6, to which detailed reference will now be made, illustrate a modified form of the invention in which the grid structure is arranged in a flat pattern instead of the cylindrical pattern in the embodiment previously described. This form of the invention comprises a duct 86 having parallel flat top and bottom walls 88 and 90 and an inclined rear wall 92, the opposite side wall being formed by the grid structure indicated generally at 94 comprising grid rods or bars which are identical with the members previously described and are mounted in the apparatus in essentially the same manner. At one end the duct 86 is provided with an inlet opening 96 which preferably extends the full height of the grid structure and the width of which is such that it provides a total opening slightly less than the effective opening formed by the grid structure. At the opposite end beyond the end of the grid structure the duct 86 is provided with a particle outlet section 98 which, at its bottom end, is in open communication with a particle collector section 100 having an outlet conduit 101 which is also in open communication with the lower end of the core holes of the individual grid rods.

The separating action of the grid bars is essentially the same as that discussed in connection with the previous embodiment. The air containing the particles enters the apparatus through the inlet 96 and passes along the outer surfaces of the grid bars with a velocity slightly higher than the velocity of the clean air passing between the grid bars thus producing the desirable effects discussed above. The larger particles will pass directly into the tube 98 and into the particle collector 100 accompanied by a small amount of bleed air. The smaller particles will pass through the core holes in the individual rods and be deposited in the dust collector 100 and moved toward the outlet end of the collector 100 by the small bleed flow through these core holes. All of the particles deposited in the collector will leave the apparatus through the conduit 101 which may lead to other apparatus or to a convenient point of disposal.

Figure 7:
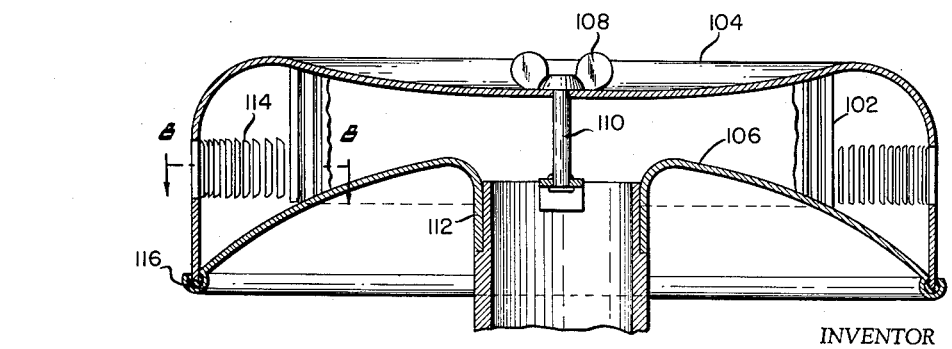
FIGURE 7 is a central vertical section of a further embodiment of the invention.

FIGURES 7 and 8 illustrate another form of the invention specifically adapted for removing dust for an air intake, to be used, for example, as a replacement for air filters now in use in carburetors for internal combustion engines.

In this form of the invention the grid bars 102, which are identical in configuration to the bars previously described, are mounted in a cylindrical pattern on a sheet metal cover assembly 104. The cover assembly 104 is removably secured to a bottom plate section 106 by a wing nut 108 which is threaded onto a stud 110 carried by the bottom plate. The bottom plate 106 has a downwardly projecting neck 112 adapted to be slipped over the main carburetor air opening in accordance with conventional practice. The outer cylindrical wall of the cover 104 is provided with a plurality of louvers 114 which direct the air in a circular pattern around the rods producing a separating action essentially the same as that described in connection with the embodiment of FIGURES 1–4. The dust separated by the grid rods falls through the grid rod core holes onto the sloping surface of the lower plate 106 where it accumulates in the region where the margins of the upper and lower members 104 and 106 join. Preferably a rubber seal 116 is provided at this point. The accumulated dust may be removed from the apparatus from time to time simply by detaching the cover 104.

The grid separators of the present invention are considerably more efficient than ordinary cyclones or multi-cyclones which are in widespread use now in industry. For example, where a multi-cyclone would collect all particles larger than 4 or 5 microns in size, the grid separator of the present invention will collect all particles down to 1½ to 2 microns at the same pressure loss. The efficiency of the grid separator is independent of its size or capacity. It can be built for very large flows of air or other fluids which can be done with cyclone type separators only if they are designed as multi-cyclones.

The grid separators of the present invention also have an efficiency which is considerably higher than the efficiency of prior grid type separators. All known prior grid type separators have an efficiency which is regarded as about the same as or less than the efficiency of a multi-cyclone separator. The grid separator of the present invention is relatively small and compact compared to the cyclones for the same flow capacity and it is accordingly considerably less expensive than cyclones or multi-cyclones.

The efficiency of the grid separators can be improved even further by charging the grid rods electrically so the particles coming close to the rods will be first attracted to the surface of the rods then assume the same charge as the rods and then be repelled. In this manner particles much smaller than the previously defined critical size can be prevented from going through the exit slots. It is to be understood that the function of the grid depends on relative motion of the grid and the surrounding fluid. This relative motion can be effected either by moving the fluid with respect to the grid or by moving the grid with respect to the fluid. Accordingly, the separators of the present invention can be employed in situations where conventional separators are not usable, i.e., for a pump intake. In such an installation the grid can be installed on the same shaft as the pump wheel in the case of a centrifugal pump or on the crankshaft in the case of a reciprocating pump. No scroll or inlet louvers would be required in this case and the grid would be protected from clogging by the centrifugal force acting on any contamination tending to stick to the rods.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for separating entrained particles from a body of fluid comprising a grid assembly including a plurality of uniformly spaced parallel identical bars, means for causing said fluid to pass in a predetermined path along one surface of said grid structure in a direction generally normal to the axes of said bars, each of said bars having side walls extending transversely of said path and an essentially central opening extending from end to end thereof, said openings communicating with the exterior of said bar through a slot extending longitudinally of said bar, said bars having a smooth convex surface projecting outwardly into said fluid path, one end of said convex surface intersecting one side of said slot in a sharp edge, an essentially flat surface leading away from the opposite edge of said slot and intersecting one of said side walls in a sharp edge extending longitudinally of said bar, said last mentioned edge forming the entrance to the space between adjacent bars.

2. The apparatus according to claim 1 wherein the adjacent side walls of adjacent bars are angularly related to provide a diffuser throat therebetween extending transversely of said path.

3. A grid element for use in a grid separator, said grid element being of uniform section from end to end and having substantially flat side wall portions, said grid element having a through longitudinally extending opening, said opening communicating with the exterior of said grid element through a longitudinally extending slot, a substantially flat surface leading from one edge of said slot to one of said side walls and intersecting said side wall in a sharp edge, and a smoothly curved convex surface leading from the opposite edge of said slot to the other of said side walls.

4. A grid element for use in a grid separating apparatus, said grid element being of uniform section from end to end and having side wall portions extending generally in the same direction, said grid element having a through longitudinally extending opening, said opening communicating with the exterior of said element through a longitudinally extending slot, a substantially flat surface leading away from one edge of said slot and intersecting one of said side wall portions in a sharp edge, and a smoothly curved convex surface intersecting the opposite edge of said slot in a sharp edge and smoothly joining said other of said side wall portions.

References Cited in the file of this patent

UNITED STATES PATENTS

| | | |
|---|---|---|
| 2,358,508 | Hersh | Sept. 19, 1944 |
| 2,448,424 | Dohrman | Aug. 31, 1948 |
| 2,546,246 | Whiton et al. | Mar. 27, 1951 |

FOREIGN PATENTS

| | | |
|---|---|---|
| 57,934 | Denmark | Aug. 19, 1940 |
| 373,127 | Italy | July 20, 1939 |
| 475,436 | Germany | Nov. 3, 1930 |
| 562,345 | Great Britain | June 28, 1944 |